United States Patent [19]
Mimick et al.

[11] Patent Number: 5,594,601
[45] Date of Patent: Jan. 14, 1997

[54] METHOD OF PROGRAMMING AUDIO TRACKS IN A SEQUENTIAL MEDIUM

[75] Inventors: Frank P. Mimick, Watauga; Daniel W. Staudacher, Denton, both of Tex.

[73] Assignee: Tandy Corporation, Fort Worth, Tex.

[21] Appl. No.: 433,596

[22] Filed: May 3, 1995

Related U.S. Application Data

[63] Continuation of Ser. No. 107,204, Aug. 13, 1993, abandoned, which is a continuation-in-part of Ser. No. 890,067, May 27, 1992, abandoned.

[51] Int. Cl.$^6$ .................................................. G11B 15/18
[52] U.S. Cl. ........................ 360/72.2; 360/137; 360/69; 360/71; 369/32
[58] Field of Search ................................ 360/72.2, 72.3, 360/72.1, 69, 15, 55, 71, 137; 395/2.87; 369/32

[56] References Cited

U.S. PATENT DOCUMENTS

| | | | |
|---|---|---|---|
| Re. 31,666 | 9/1984 | Doi et al. | 371/45 |
| 4,210,940 | 9/1978 | Prysby et al. | 360/72.3 |
| 4,339,776 | 7/1982 | Langer et al. | 360/69 |
| 4,546,474 | 10/1985 | Sako et al. | 371/37.5 |
| 4,620,311 | 10/1986 | Immink | 375/19 |
| 4,695,908 | 9/1987 | Imakoshi et al. | 360/119 |
| 4,799,179 | 1/1989 | Masson et al. | 364/724.1 |
| 4,972,484 | 11/1990 | Theile et al. | 395/236 |
| 5,051,971 | 9/1991 | Yamagishi et al. | 360/15 X |

OTHER PUBLICATIONS

Yamaha CD-3 Owner's Manual, pp. 1-16.
"Technics Multi Compact Disc Player SC-PC10 Operating Instructions", May 1989, all pages.
"Digital Audio Tape Desk Operating Instructions" Sony Corp., 1990, pp. All.
DCC System Description vol. 1, Digital DCC Compact Cassette, published by Philips Consumer Electronics B.V., Mar. 1993.
Digital DCC Compact Cassette, published by Philips Consumer Electronics, Feb. 1991.

*Primary Examiner*—Aristotelis Psitos
*Assistant Examiner*—James T. Wilson
*Attorney, Agent, or Firm*—Stephen S. Mosher; John F. McGowan

[57] ABSTRACT

In accordance with the invention, a method for programing or editing, or both, the order of performance of digitally recorded information tracks, such as an audio recording, stored sequentially in an appropriate medium. The method allows a user to program or edit, via keystrokes, a program or sequence of tracks to be played. An apparatus for playing information tracks queued to be replayed in a predetermined sequence includes a key pad, which is used to enter commands and numeric information to establish a program queue, a display, which is used to display program events, and an interface processor, coupled to the key pad and the display, which is used to control the commands received from and sent to the key pad and to send display messages to the display. The apparatus also includes a control processor, coupled to the interface processor, which establishes from information stored on a medium in a sequential order, an ordered sequence of information tracks. The apparatus further includes reading circuitry, coupled to the control processor, for reading the information tracks and converting the information tracks into a form different than as stored in the medium according to the ordered sequence in which they are stored.

32 Claims, 3 Drawing Sheets

METHOD OF PROGRAMMING AUDIO TRACKS IN A SEQUENTIAL MEDIUM

CROSS REFERENCE TO RELATED APPLICATION

This is a continuation of application Ser. No. 08/107,204, filed Aug. 13, 1993, now abandoned, which is a continuation-in-part application of U.S. patent application Ser. No. 07/890,067 entitled METHOD OF PROGRAMMING AUDIO TRACKS IN A SEQUENTIAL MEDIUM, filed on May 27, 1992, now abandoned, assigned to the assignee of the present application, and incorporated herein by reference as if reproduced in its entirety.

BACKGROUND OF THE INVENTION

The invention relates to data recording devices; and, more particularly, to the program editing and selection of digitally encoded data tracks in a sequential medium such as magnetic tape.

Digitally encoded data is stored in a variety of media with modern electronic equipment including solid state memories, rotating discs of magnetic or optical media, and on magnetic tape.. While magnetic tape is characterized by simplicity of manufacture, high recording density, low cost and ease of use, it has one important limitation in that data must be recorded in a sequential path along the length of the tape. A relatively long time is required to locate the desired data for retrieval or editing because the tape may need to be wound over nearly its full length to the position of the data. Thus the access time is the major component of a retrieval parameter called latency. This access time is much longer than it is for solid state or rotating media. Magnetic tape is therefore, said to have a very high latency.

The high latency of magnetic tape is a persistent limitation that has only been partly overcome. It is a particular problem in the field of audio recording where it is frequently desired to access quickly the next selection for editing or playback.

Users accustomed to the rapid and versatile accessibility available with rotating media such as compact optical discs or magnetic floppy drives, would be more likely to employ magnetic tape to enable recording of favorite selections if the tape apparatus provided at least some of the random access capabilities of rotating media systems.

Previously, there have been several methods for accessing the data on magnetic tape. The manual cue and review method used with current audio and video recorders consists of manually operating the machine controls until the desired selection is heard or seen on a monitor, winding the tape to the desired point and then playing or recording from that point while keeping track of its position with a written or spoken record based on timing or tape length marking information. Some systems of this type employ rotation counters to keep track of tape position. This method is cumbersome, inefficient and not suited for digitally encoded information.

Other systems have automated some of these functions by combining marker signals on the tape, counter-detectors in the electronics and direct-entry of desired location information from a keyboard connected to control logic circuitry to enable the user to position the tape at the location of the desired data. An indicator also can be provided to display this location information to the user. Further, a separate index of data identity and data location also is needed for the user to position the tape for play, record or edit. Back-up or archival tape storage systems for computers and the more recent Digital Audio Tape systems are examples of this method that, in addition to being suited to digitally encoded data, offers more convenience in operation.

These systems, however, are limited because often, special information must be added during recording that reduces available recording capacity. The information is not available on pre-recorded tapes. The specific information would be specific to a particular hardware platform, thus it would not be interchangeable between similar hardware from other manufacturers.

Accordingly, what is needed is a method of programming audio tracks stored in a sequential medium, such as magnetic tape, that is compatible with other formats or platforms, or both, in the industry. The method should also provide editing features, which allows a user to edit the program.

SUMMARY OF THE INVENTION

In accordance with the invention, an apparatus and method for programming or editing, or both, the order of performance of digitally recorded information tracks, such as an audio recording, stored sequentially in an appropriate medium is disclosed. The method allows a user to program or edit, via keystrokes, a program or sequence of tracks to be played.

According to the invention, an apparatus for playing information tracks queued to be replayed in a predetermined sequence is disclosed and includes a key pad, which is used to enter commands and numeric information to establish a program queue, a display, which is used to display program events, and an interface processor, coupled to the key pad and the display, which is used to control the commands received from and sent to the key pad and to send display messages to the display. Importantly, the apparatus includes a control processor, coupled to the interface processor, which establishes from information stored on a medium, on which is stored selected information in a sequential order, an ordered sequence of information tracks on the medium. The apparatus further includes means, coupled to the control processor, for reading the information tracks and converting the information tracks into a form different than as stored in the medium according to the ordered sequence in which they are stored.

The apparatus is capable of playing audio magnetic tape, which records or plays, or both, in digital form. The digital audio tape unit includes means for compressing and reconstituting the information stored on the audio magnetic tape. And finally, the control processor further comprises means for editing the ordered sequence of information tracks.

DETAILED DESCRIPTION OF SPECIFIC EMBODIMENTS

The invention is directed to a sequential queuing and programming system for use in magnetic media based systems. Specifically, the system provides programmable control capabilities to a user for controlling the tape motion, which enables direct access to data tracks individually or as members of a set, in sequence. In addition, the user can deselect or add a track or selection as well as select members of a group from the sequence. These functions can be readily implemented by way of direct key entry. The system can also display the status of any action taken, which display can be updated and adjusted on command. The displayed status includes the function being performed, the track or selections selected, remaining, or available, and the selections to be played. The system also allows the user to build program play lists, which can be edited at any time by the user. First, FIGS. 1–3 describe a system environment which the track programming method is to be operated. Next, the functions and abilities of the method are illustrated in the accompanying flow charts of FIG. 4 and described in greater detail below.

Figure 1:
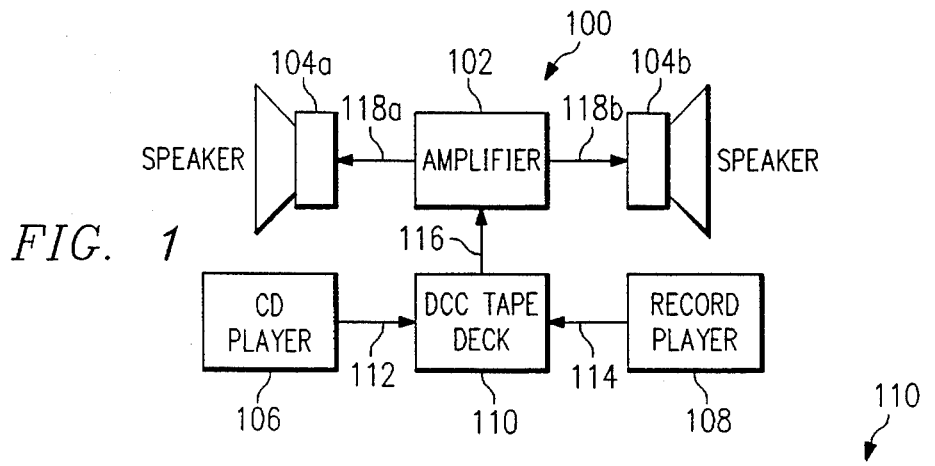
FIG. 1 is a functional block diagram of a high fidelity stereo system including a digital compact cassette deck incorporating features of the present invention.

In FIG. 1, the reference numeral 100 designates a high-fidelity stereo system embodying principles of the present invention. The system 100 includes a stereo amplifier 102, two speakers 104a, 104b, a compact disk (CD) player 106, a high-fidelity stereo record-player 108, and a digital compact cassette (DCC) deck 110. The deck 110 is utilized principally for the recording and playback of digital audio tape (not shown) configured in the DCC format, and may also be utilized for playback of standard, prerecorded analog cassette tapes. It is understood that multiple program track selections of music or other information may be played and/or recorded on the tape utilizing the deck 110. As will be discussed in detail below, the present invention relates to improved implementation of automatic search operations by the deck 110 to locate and play the selections in any order desired by the user.

Figure 2:
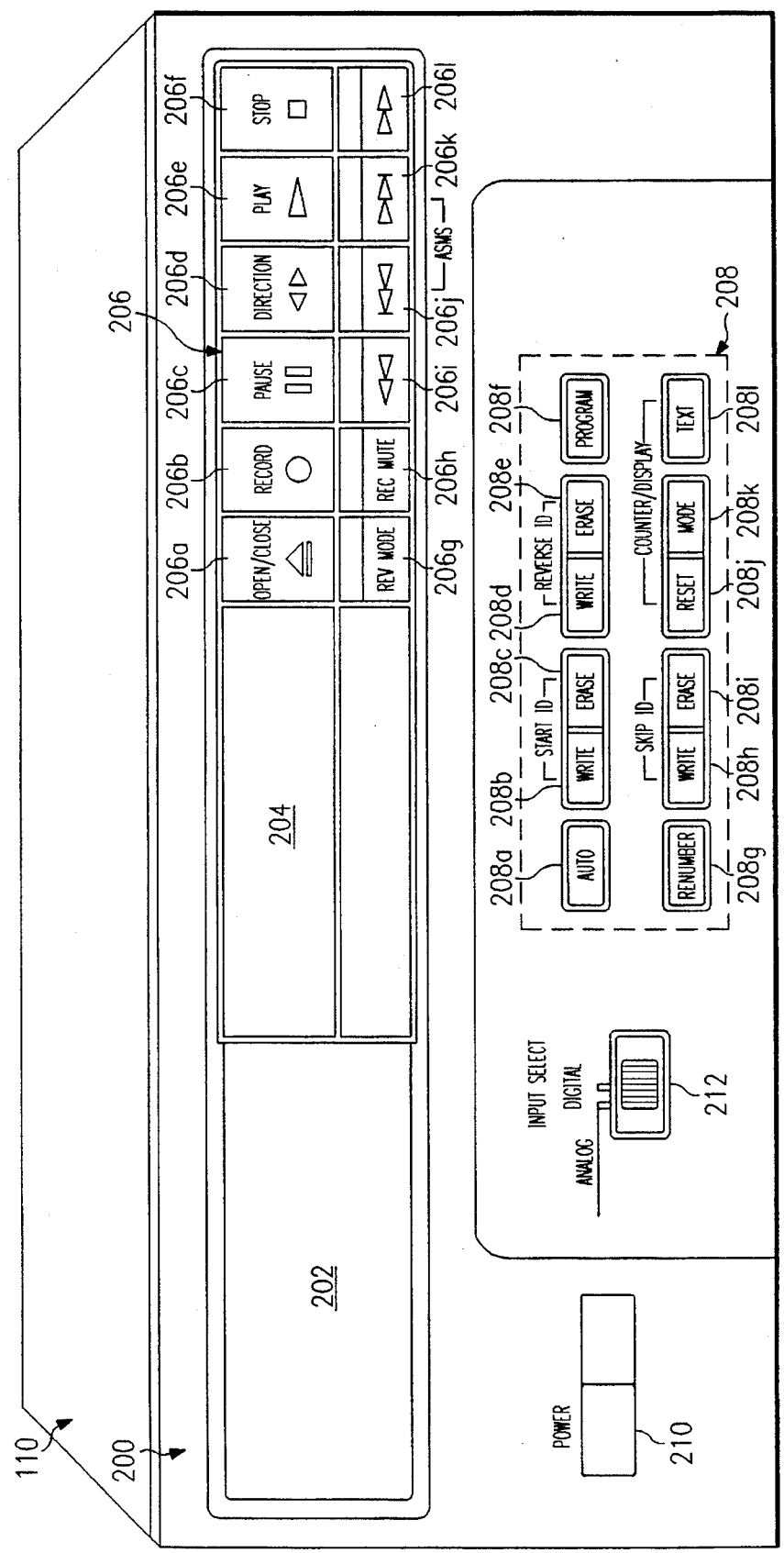
FIG. 2 is a perspective view of the front panel of the digital compact cassette deck of FIG. 1.

The CD player 106 and the record player 108 are included as part of the system 100 to represent typical examples of digital and analog input sources, respectively, to the deck 110. The CD player 106 and the record player 108 provide the deck 110 with digital and analog inputs on lines 112 and 114, respectively, for purposes of recording a DCC tape using the deck 110. A line 116 connects the output of the deck 110 to the amplifier 102 which amplifies the output signal from the deck 110 and transmits the amplified signal to the speakers 104a, 14b via lines 118a, 118b, respectively. It is understood that FIG. 1 has been simplified for illustration purposes and that, in general, additional connectors would be utilized for connecting the amplifier 102 to the CD player 106 and to the record player 108. FIG. 2 illustrates the front panel 200 of the deck 110. The panel 200 includes a luminescent strip display 202 for the display of icons and alphanumerics, a tape drawer 204 for the loading and unloading of both analog and DCC tapes, a system control panel 206 for user interface and control of system functions, an edit control panel 208 for user interface and control of DC tape editing functions, a power switch 210 for turning the deck 110 on and off, and an input select switch 212 for selecting either the analog input from the record player 108, or the digital input from the compact disk player 106, to the deck 110.

The system control panel 206 includes an "open/close" switch 206a that controls the opening and closing of the tape drawer 204, a "record" switch 206b that places deck 110 in a record-pause mode, a "pause" switch 206c that places the deck in either a pause or an unpause mode, a "direction" switch 206d that controls the direction of motion of the tape during record and play-back modes of operation, a "stop" switch 206f to stop the operation of deck, and a "play" switch 206e to initiate the playing of a tape. The control panel 206 further includes a "reverse mode" switch 206g that sets-up the auto-reverse function of the deck 110 for automatic control of the playing of a tape, a "record mute" switch 206h for the recording of four seconds of silence, a "rewind" switch 206i for the rewinding of a tape, a "search reverse" switch 206j for automatic search to the beginning of a previous track, a "search forward" switch 206k for the automatic search to the beginning of the next track, and a "fast forward" switch 206l for fast forwarding of a tape.

It should be noted that once the record switch 206b has been pressed, placing the deck 110 in a record-pause mode, either the pause switch 206c or the play switch 206e must be subsequently pressed in order to place the deck in the record mode. The edit control panel 208 includes an "auto-id" switch 208a that toggles the current auto-ID mode of operation, a "start ID write" switch 208b for placing a start marker on the tape to identify the start of a particular program track, an "start ID erase" switch 208c for the removal of a start marker, a "reverse ID" write switch 208d for placing a reverse marker on the tape to identify the point on the tape at which the deck 110 should reverse direction of play, a "reverse ID erase" switch 208e for removal of a reverse marker, and a "program" switch 208f for programming the order in which the tape tracks are played. The panel 208 further includes a "renumber" switch 208g for the renumbering of program tracks, a "skip ID write" switch 208h for placing a skip marker on the tape to identify particular program tracks to be skipped over so that they will not to be played, a "skip ID erase" switch 208i for removal of a skip marker, a "reset" switch 208j for resetting the tape counter, a "mode" switch 208k for selecting the mode of the tape counter, such as track time, remaining track time, actual time of the tape, or the like to be displayed on the display 202, and a "text" switch 208l for selecting the type of text data, such as, track title, artist, credits, lyrics, or the like to be displayed on the display 202.

Figure 3:
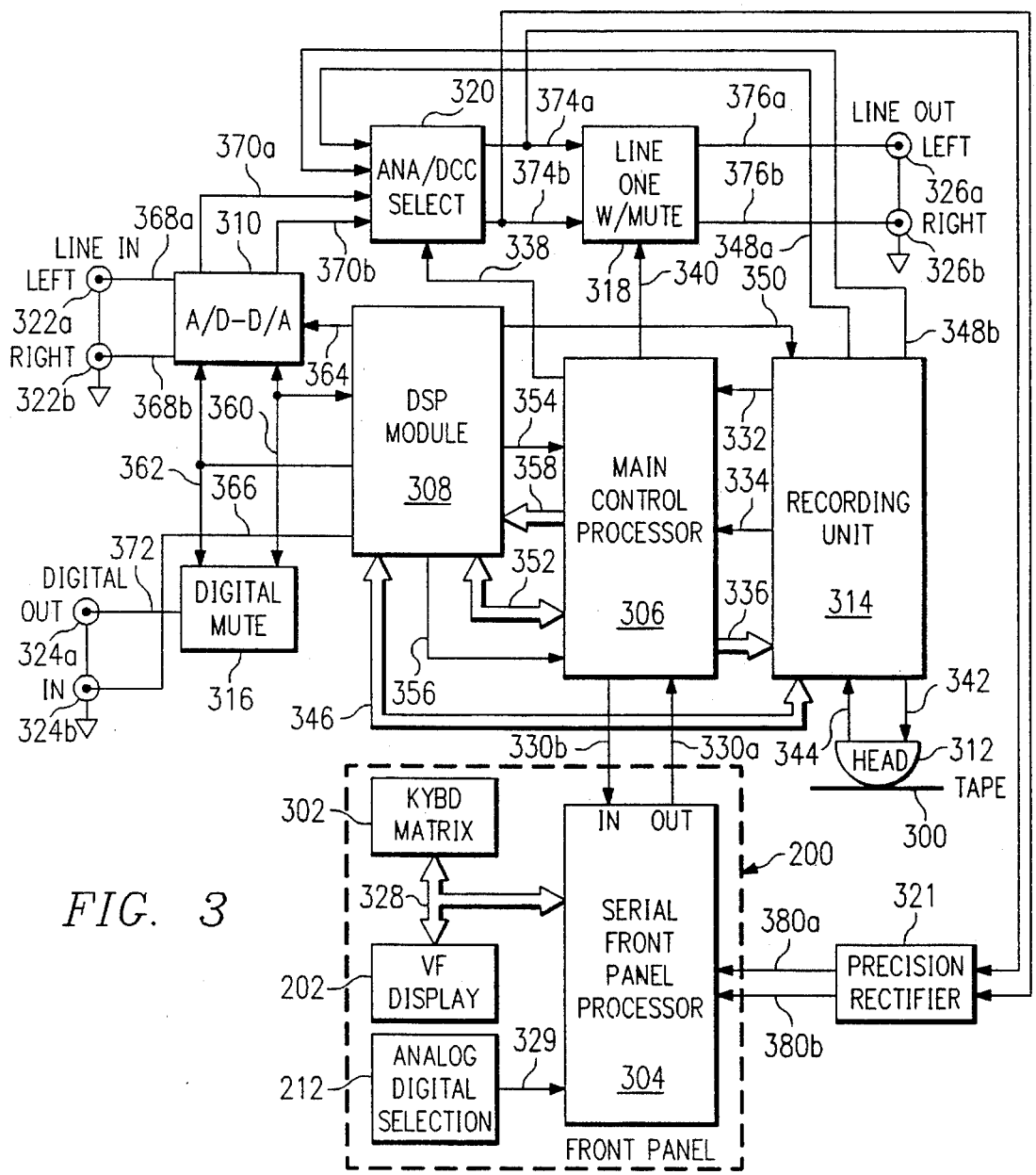
FIG. 3 is a functional block diagram of the digital compact cassette deck of FIG. 1; and, FIG. 4 is a flow chart illustrating the programming and editing control logic used in the present invention to generate a list of tracks to be played in a given sequence.

FIG. 3 is a functional block diagram illustrating the various components of the deck 110. It is understood that the deck 110 is utilized for the recording, playback and editing of audio information, such as high fidelity stereo music or the like, on a DCC tape 300 received in the tape drawer 204 (FIG. 2). It is also understood that the tape 300 is either prerecorded or consumer-recorded using a DCC deck, such as the deck 110. The deck 110 is also able to receive and playback standard analog cassette tapes (not shown). The front panel 200 of the deck 110 includes the luminescent display 202, a select switch 212, a keyboard matrix 302, and a front panel processor 304. The deck 110 further includes a main processor 306, a DCC digital signal processor (DDSP) module 308, a analog-to-digital (A/D) and digital-to-analog (D/A) converter 310, a digital compact cassette record/play magnetic head 312, a recording unit 314, including a tape drive mechanism and a drive processor (not shown), a digital signal mute circuit 316, an analog signal mute circuit 318, an analog/DCC select circuit 320 and a precision rectifier 321. Two line input jacks 322a, 322b, a digital input jack 324a, a digital output jack 324b, and two line output jacks 326a, 326b are also provided, as discussed further below.

The keyboard matrix 302 includes the control panels 206 and 208 (FIG. 2) and provides an operator with a means to interface and interact with the deck 110. The front panel processor 304 is connected to the keyboard matrix 302 by a bus 328 that continuously strobes the keyboard matrix to determine when any of the switches 206a–206l or 208a–208l are pressed. Further, the processor 304 is connected to the display 202 by the bus 328 and controls the display of icons and alphanumeric information on the display and to the select switch 212 by a line 329 that is used to indicate the position of the switch 212. The processor 304 is connected to the main processor 306 by two serial bus lines 330a, 330b that are used for the transfer of information between the processors 304 and 306. The main processor 306 has direct control over all system operations and functions within the deck 110 and contains the program instructions for implementing the automatic search functions of the present invention, described in detail below. The main processor 306 is connected to the recording unit 314 by a status line 332, a feedback line 334 and a data bus 336. The status line 332 gives the main processor 306 the current status of the tape 300. The tape status includes whether the tape 300 is a DCC or an analog cassette, whether the tape is record-prevented, and the time-length of the tape. The feedback line 334 indicates to the control processor 306 whether the tape 300 is moving, stopped or broken, the position of the head 312 (in, out, or in the search position), and whether the tape is transparent, thus indicating the end of the tape. A bus 336 is used by the main control processor 306 to control the functions of the recording unit 314. These functions include the speed and direction of movement of the tape 300, the position of the tape head 312 and the tension on the tape. A control line 338 connects the processor 306 to the select circuit 320 and enables the processor to select the output source depending on whether the tape 300 is analog or digital. Similarly, a control line 340 connects the processor 306 to the mute circuit 318 and enables the processor to mute the analog output.

While not shown, it is understood that the recording unit 314 includes a capstan drive, a reel drive, a head position solenoid, a read amplifier and a write amplifier. The recording unit 314 is connected to the head 312 by a write line 342 and a read line 344 which are used for the writing and reading, respectively, of digital data, including audio data, system information, including the copyright protection status, parity codes for error detection and correction, and auxiliary data from the tape 300. The read line 344 is also used in receiving an analog signal from the head 312 during playback of an analog tape (not shown). The recording unit 314 is connected to the DDSP module 308 by a plurality of buses designated with the reference numeral 346. The buses 346 include a serial clock bus and nine parallel data buses that are used for the synchronous transfer of data to and from the recording unit 314. The recording unit 314 is connected to the select circuit 320 by a left channel output line 348a and a right channel output line 348b that are used by the recording unit 314 during the playback of an analog tape (not shown) and to the DDSP module 308 by a speed control line 350 that is used during playback to control the speed of motion of the tape 300 and, consequently, the rate in which data is transferred to the DDSP module via the buses 346. The precision rectifier 321 is connected to the outputs of the analog DCC select switch at lines 374a and 374b.

The DDSP module 308 has direct control over the encoding, decoding, formatting and error correction of the data exchanged on the buses 346. While not shown, the module 308 includes five main components, which are a DDSP for the formatting and unformatting of data, an error correction device for error detection and correction, a sub-band codec device for the coding and decoding of sub-bands of the sampled audio data, a digital audio interface for interaction between the DDSP and the converter 310, and a digital equalizer to overcome the distortion made in the tape recording and playback processes. In the playback of the tape 300, digital data is transferred to the DDSP module 308 by the buses 346 and the DDSP module 308 unformats the data and corrects any correctable errors using a Reed-Solomon encryption code, well known in the art. The unformatted data is transferred to the main control processor 306 via a bidirectional bus 352. A determination is made from the unformatted data as to how the tape 300 was recorded and, consequently, the processor 306 transfers the appropriate digital equalizer filter coefficients to the module 308. It is understood that the digital equalizer consists of multi-tapped filters used to optimize the digital signals received from the read amplifier attached to the thin-film head 312, as is well known in the art.

A synchronous start segment control line 354 connects the DDSP module 308 to the main processor 306 and indicates to the processor when it is time to either transmit or receive data. An asynchronous label control line 356 also connects the module 308 to the processor 306 and indicates to the processor the occurrence of a label on the tape 300, as will be discussed. A plurality of control lines 358 enable the processor 306 to select which of the aforementioned main components of the DDSP module 308 are to either receive or transmit data via the bus 352. The DDSP module 308 is connected to the converter 310 and to the mute circuit 316 by a serial data bus 360 and a control line 362 for the transfer of digital data and for muting the digital output from the deck 110, respectively. Further, the DDSP module 308 supplies a clock signal to the converter 310 via a line 364 for the clocking in and out of data via the serial bus 360, and receives digital data input from the jack 324b on a line 366 for subsequent PASC data compression.

The converter 310 is used to convert analog signals to digital signals and digital signals to analog signals. The converter 310 receives analog audio inputs for right channel and left channel from the jacks 322a, 322b via two lines 368a, 368b, respectively, and converts the signal to an 16-bit serial digital signal that is sent to the DDSP module 308 and to the mute circuit 316 on the serial bus 360. In addition, the converter 310 receives digital data that has undergone PASC data decompression via the serial data bus 360 and converts the data into left and right channel analog signals for output via two lines 370a, and 370b, respectively. Further, the analog output signal on the lines 370a, 370b can be inhibited or muted by the DDSP module 308 via a control signal on the line 362.

The digital mute circuit 316 is used by the deck 110 to mute the digital output from the jack 324a, as commanded by the DDSP module 308 via the control line 362. Typically, the circuit 316 receives serial data from the DDSP module 308 on the serial bus 360 and outputs same from the jack 324a via a line 372. The analog/DCC select circuit 320 enables the processor 306 to select either the inputs from the recording unit 314 on the lines 348a, 348b used during the playback of an analog tape or the input from the converter 310 on the line 370a, 370b used during the playback of the DCC tape 300 via the control line 338, and to output the left and right channels of the selected input to the mute circuit 318 on two lines 374a and 374b, respectively. Similarly, the mute circuit 318 is used by the deck 110 to mute the stereo output from the jacks 326a, 326b, as commanded by the processor 306 via the control line 340. Typically, the circuit 318 receives left and right channel inputs on lines 374a and 374b and outputs the same to the jacks 326a, 326b on two lines 376a, 376b, respectively. The precision rectifier 321 is connected to the analog right and left channel output lines 348a, 348b and is used to convert the alternating output signal to direct current with a known conversion efficiency. The rectified signal is input to the front panel processor 304 via two input lines 380a, 380b. The processor 304 uses the rectified signal to determine the beginning of a new program track predicated on the assumption that both left and right channels exceed −10 dB to arm the system and that the track is preceded by silence (−40 dB) for a period of 4 seconds, and to display a relative signal level via a dB-scaled bar graph.

It is understood that the output of the record player 108 is input on the line 114 to the deck 110 via the jacks 326a, 326b and the CD player 106 is input on the line 112 to the deck via the jack 324b. Similarly, the output of the deck 110 is input on the line 116 to the amplifier 102 via the jacks 326a, 326b.

Figure 4:
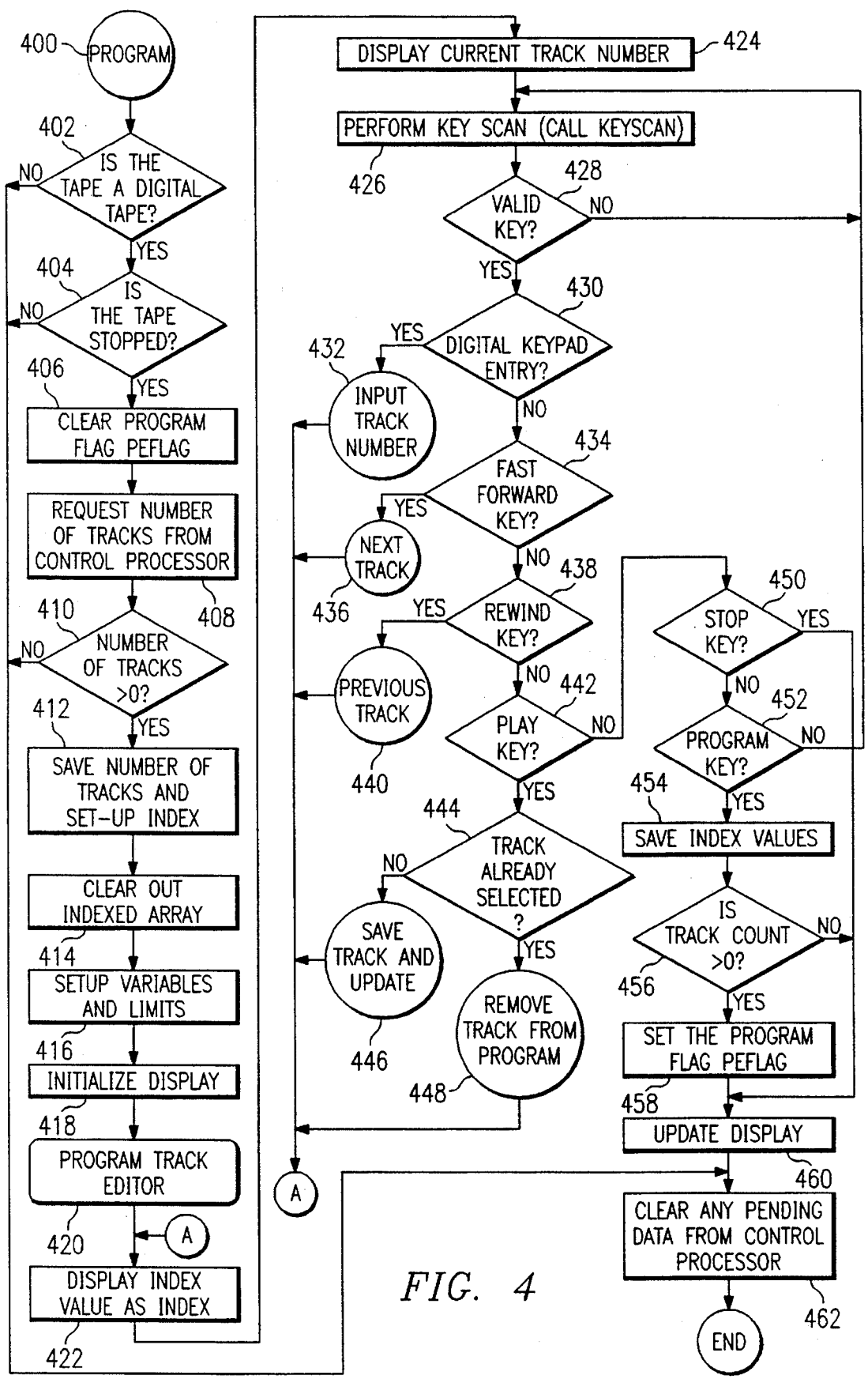

The flow chart illustrated in FIG. 4 shows the steps taken to enable the user to program, display and/or modify the audio track sequence to be performed by the cassette deck via entry through the keyboard. All commands begin in the interface processor and the system performs a program editing initialization. In step 400, the system begins the program entry once a program switch 208f has been pressed and recognized by the interface processor. Once a signal from the switch has been recognized, the system enables the program editor subroutine, which allows the user to begin generation of a program. The system must determine if the tape being programmed has the capability to be programmed. For instance, the DCC cassette deck may have either a DCC cassette tape or an analog cassette tape in the tape transport. The system, in step 402, determines if the cassette tape is a DCC cassette tape, which has the ability to be programmed due to the information stored in the auxiliary track. If the cassette tape is not a DCC tape, the system proceeds to step 462.

If in step 402, the system is satisfied that it is playing a DCC tape, the system, in step 404, determines if the tape is stopped, which can be done by looking at the prior status of the tape deck. If the tape is not stopped, the system proceeds to step 462; otherwise, the system, in step 406, clears the program flag, indicating that no program exists ("PEFLAG"). The program flag indicates whether a program has been established, which program specifies a sequence of selected tracks. Next, the system, in step 408, determines if there is a table of contents ("TOC") by requesting the number of tracks loaded in the control or system processor. If the number of tracks in the system processor is not greater than zero (step 410), the system proceeds to step 462. Otherwise, the system, in step 412, saves the number of tracks and set-up index in a register labeled PINDEX, which points to the beginning of the index. Next, the system clears the indexed array (step 414), which is a table that contains the track numbers to be played. Once the indexed array has been cleared, the system, in step 416, sets up variables and limits as recorded in the TOC of the tape, or as established by the number of tracks on the tape. Other variables and limits include the total number of tracks that are playable. After setting up the variables and limits, the system, in step 418, initializes the display, by displaying the current track as "01" and the program track pointer ("MINDEX") as "00".

If at any time during the initialization of the programming and editing feature of the digital tracks, the digital tape detector fails to detect a DCC cassette tape (step 402), the tape is stopped (step 404), or the number of tracks from the table of contents ("TOC") is zero (0) (step 410), the system, in step 462, clears any and all pending data from the control processor and then exits back to the main routine.

Once the digital track entry program has been initialized, the system then enters the program track editor subroutine (step 420). In step 422, the system displays the contents of the memory index, or the MINDEX value. After displaying the MINDEX value, the system, in step 424, displays the contents of the current track number register, or the CURTRACK value. Next, the system, in step 426, performs a keyscan by calling the CALL KEYSCAN routine, which gets any key press detected by the front panel microprocessor. To process the key stroke, the system debounces the key pressed before it can validate the key value stored in the microprocessor (step 428). If the key value is valid, the system, in step 430, determines if the key value is a digital value entered at the keyboard. If it is a digital keypad entry, the system, in step 432, inputs the track number selected, as represented by the number entered on the digital keypad. After entering the number, the system returns to step 422 to process the next action taken on the keypad.

If the key entry is not on the digital keypad, the system, in step 434, determines if the key entered is the fast forward key. If yes, the system, in step 436, advances to the next track by advancing a CURTRACK variable by one; the value of CURTRACK will not increment beyond the number of tracks stored on the tape, as indicated in the TOC. The MINDEX register will not increment until the PLAY key is pressed. Next, the system returns to step 422 to process the next action taken by the user.

If the fast forward key was not pressed, the system, in step 438, determines if the rewind key was pressed. If yes, the system decrements the CURTRACK variable by one, but not below zero. Afterwards, the system returns to step 422 to process the next action taken by the user. If neither the fast forward nor reverse key has been pressed, the system will, in step 442, determine if the play key has been pressed. If the play key has been pressed, the system will, via a TRACK-MATCH routine, check to determine if the CURTRACK variable has been entered into the table. If it has been entered, when the play key is pressed or selected, the system will remove the variable from the table of tracks in step 448 and place the CURTRACK value displayed into the table of tracks in sequential order. The system will assure that no zero bytes are in the sequence and that all numbers are arrayed in ascending order. If it has not been selected, when the play key is pressed or selected, the system will add the variable to the table of tracks to be played in step 446.

Once the track has been saved and updated (step 446), or the track has been removed from the program (step 448), system returns to step 422 to determine the next action taken by the user or the program sequence.

If, in step 442, the play key has not been selected, the system, in step 450, determines if the stop key, or abort, has been selected and if so, proceeds to step 460 where the system updates the display before clearing the control processor of pending data and then exiting. If the stop key has not been pressed, the system, in step 452, determines if the program key has been pressed and if not, the system repeats steps 426–452. If the program key has been pressed, the system, in step 454, registers that the end of programming has occurred and proceeds to step 456.

Once the programming has been ended, the system, in step 456, saves the index values and then determines in step 458 if the track count is greater than zero. If the track count is greater than zero, the system, in step 464, sets the program flag, which indicates a valid program exists. After setting the program flag the system proceeds to steps 460–462 before exiting.

Although the invention has been described in terms of a selected preferred embodiment encompassing the apparatus and methods of a digital audio tape player with audio track programmability, the invention should not be deemed limited thereto, since other embodiments and modification will readily occur to one skilled in the art.

What is claimed is:

1. A method for editing a playback sequence of tracks stored in a memory comprising:

selecting a track number for editing, during a playback programming routine, wherein the track number is incremented upon pressing a first switch or decremented upon pressing a second switch; and editing the playback sequence upon pressing a third switch wherein the track number selected is entered in the memory when it is not present therein and deleted from the memory when it is present therein.

2. The method of claim 1 comprising returning to the selecting step.

3. The method of claim 1 comprising:

terminating the editing mode when a fourth switch is pressed.

4. The method of claim 3 wherein the step of terminating the editing mode aborts the editing step.

5. The method of claim 4 wherein the step of terminating the editing mode comprises updating the display and clearing pending data.

6. The method of claim 3 wherein the fourth switch is a stop key.

7. The method of claim 1 comprising:

saving selected track numbers when a fourth switch is pressed.

8. The method of claim 7 wherein the step of saving comprises:

verifying that a count of the track umbers is non-zero; and setting a program-exists flag.

9. The method of claim 8 comprising updating the display and terminating the playback programming routine.

10. The method of claim 7 wherein the fourth switch is a program key.

11. The method of claim 1 comprising assigning selected function keys as the first, second and third switches.

12. The method of claim 11 wherein the first, second and third switches are respectively fast forward, rewind and play keys.

13. A method for editing a playback sequence of tracks stored in a memory comprising:

entering a programming routine and initializing the memory and a display;

entering an editing mode;

scanning a switch array;

selecting a track number for editing wherein the track number is incremented upon pressing a first switch or decremented upon pressing a second switch;

editing the playback sequence upon pressing a third switch wherein the track number selected is entered in the memory when it is not present therein and deleted from the memory when it is present therein; and returning to scanning a switch array.

14. The method of claim 13 wherein the step of repeating comprises subsequent activation of said first or second switch.

15. The method of claim 13 comprising exiting the editing mode when a fourth switch is pressed.

16. The method of claim 15 comprising terminating the programming routine upon exiting the editing mode.

17. The method of claim 16 wherein the step of terminating comprises updating the display and clearing pending data.

18. The method of claim 13 comprising saving the playback sequence of track numbers as edited when a fourth switch is pressed.

19. The method of claim 18 wherein the step of saving the playback sequence comprises:

verifying that a count of track numbers is non-zero;

setting a program exists flag; and terminating the programming routine.

20. A method for editing a playback sequence of tracks stored in a memory comprising:

entering a programming routine and initializing the memory and a display;

entering an editing mode;

scanning a switch array;

selecting a track number for editing wherein the track number is incremented upon pressing a first switch or decremented upon pressing a second switch;

editing the playback sequence upon pressing a third switch wherein the track number selected is entered in the memory when it is not present therein and deleted from the memory when it is present therein;

exiting the editing mode when a fourth switch is pressed; and terminating the programming routine.

21. The method of claim 20 wherein the step of entering a programming routine comprises checking for the presence of a digitally recorded medium and saving the number representing the number of tracks recorded therein.

22. The method of claim 20 wherein the step of entering an editing mode comprises displaying the number of track numbers and a current track number.

23. The method of claim 20 wherein the step of scanning comprises debouncing the switch array and determining whether the switch array comprises digit keys or function switches.

24. The method of claim 20 wherein the step of exiting the editing mode comprises aborting the editing step and terminating the programming routine when the fourth switch is a stop key.

25. The method of claim 20 wherein the step of exiting the editing mode comprises saving the sequence of track numbers as edited when the fourth switch is a program key, verifying that a count of track numbers is non-zero, and setting a program-exists flag.

26. The method of claim 20 wherein the terminating step comprises updating the display and clearing pending data.

27. A method for editing a playback sequence of tracks stored in a memory comprising:

entering a programming routine and initializing the memory and a display;

entering a editing mode;

scanning a switch array;

selecting a track number for editing wherein the track number is incremented upon pressing a first switch or decremented upon pressing a second switch;

editing the playback sequence upon pressing a third switch wherein the track number selected is entered in the memory when it is not present therein and deleted from the memory when it is present therein;

saving the playback sequence of track numbers as edited when a program switch is pressed; and terminating the programming routine.

28. The method of claim 27 wherein the step of entering a programming routine comprises checking for the presence of a digitally recorded medium and saving the number representing the number of tracks recorded therein.

29. The method of claim 27 wherein the step of entering an editing mode comprises displaying the number of track numbers and a current track number.

30. The method of claim 27 wherein the step of scanning comprises debouncing the switch array and determining whether the switch array comprises digit keys or function switches.

31. The method of claim 27 wherein the step of saving the playback sequence comprises saving one or more track numbers, verifying that a count of track numbers is non-zero, and setting a program-exists flag.

32. The method of claim 27 wherein the terminating step comprises updating the display and clearing pending data.

* * * * *